United States Patent [19]
Henn et al.

[11] Patent Number: 6,045,633
[45] Date of Patent: Apr. 4, 2000

[54] STEEL HOLDER BLOCK FOR PLASTIC MOLDING

[75] Inventors: Eric D. Henn, Orange, Calif.; Robert J. Friedrich, Wayne, Pa.; Michael A. Guscott, Santa Ana, Calif.

[73] Assignee: EDRO Engineering, Inc., Walnut, Calif.

[21] Appl. No.: 09/078,884

[22] Filed: May 14, 1998

Related U.S. Application Data

[60] Provisional application No. 60/046,633, May 16, 1997.

[51] Int. Cl.$^7$ ........................................ C21D 6/02
[52] U.S. Cl. ................................... 148/608; 148/609
[58] Field of Search ...................... 148/608, 609

[56] References Cited

U.S. PATENT DOCUMENTS

| | | | |
|---|---|---|---|
| 5,364,588 | 11/1994 | Finkl et al. | 420/67 |
| 5,370,750 | 12/1994 | Novotny et al. | 148/325 |
| 5,496,421 | 3/1996 | Hashizume et al. | 148/326 |
| 5,512,237 | 4/1996 | Stigenberg | 420/49 |

*Primary Examiner*—Sikyin Ip
*Attorney, Agent, or Firm*—Knobbe, Martens, Olson & Bear LLP

[57] ABSTRACT

A manufacturing mold base for plastic injection molds is formed from a martensitic stainless steel alloy comprising: about 0.03%–0.06% by weight C, about 1.0%–1.6% by weight Mn, about 0.01%–0.03% by weight P, about 0.06%–0.3% by weight S, about 0.25%–1.0% by weight Si, about 12.0%–14.0% by weight Cr, about 0.5%–1.3% by weight Cu, about 0.01%–0.1% by weight V, about 0.02%–0.08% by weight N, with the balance being Fe with trace amounts of ordinarily present elements.

5 Claims, 2 Drawing Sheets

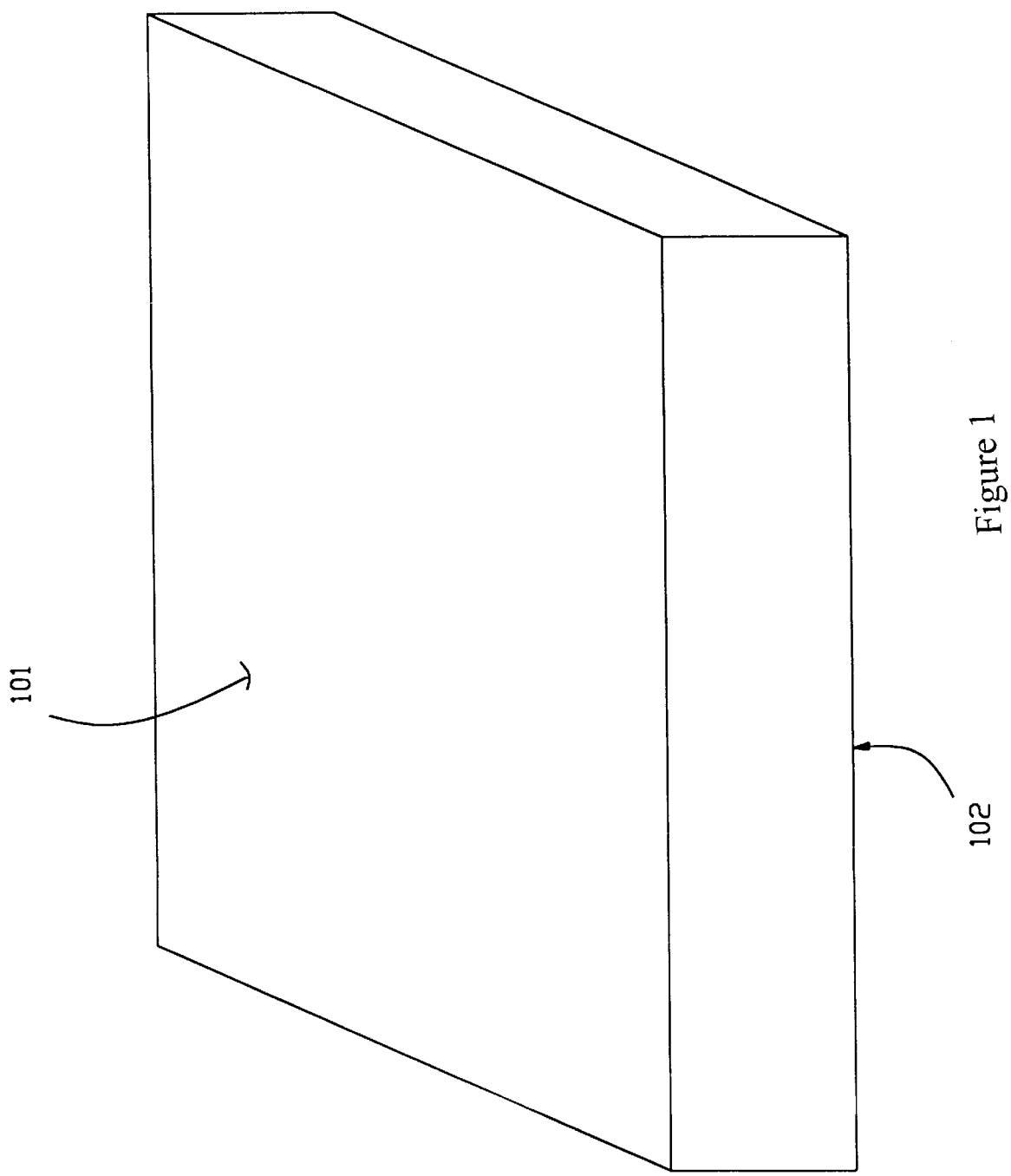

STEEL HOLDER BLOCK FOR PLASTIC MOLDING

This application claims the benefit of U.S. Provisional application No. 60/046,633 filed May 16, 1997.

BACKGROUND OF THE INVENTION

1. Field of Invention

This invention relates to a specific class of martensitic stainless steel designed and optimized for use in building mold bases for plastic injection mold tooling.

2. Description of Prior Art

Mold bases for plastic injection molds have evolved with increasing sophistication as the uses of and demands on plastics have grown. Initially these tools were constructed mainly of carbon and low alloy steels. New plastics, higher operating stresses, larger high cavitation tooling, longer production runs and inherent corrosion problems with the application led to the use of stainless steels in increasing quantities since around 1980, however the stainless steels in predominant use have many undesirable features.

The stainless steels in use for this application are essentially modifications of a standard AISI 420 stainless steel (S42000), in some cases with sulfur additions to enhance machinability. No suitable stainless grade for this specific application was ever developed. Major disadvantages of the current grades are:

(a) Very high hardenability, capable of developing Rockwell-C hardness in excess of 50 Rockwell-C. The application typically only requires hardness in the range of 32 to 39 Rockwell-C. The extreme hardenability demands extensive thermal processing at the ingot manufacture stage, hot working stage and heat treating stage to prevent catastrophic cracking in the raw product. Lengthy annealing cycles are required to render the material safe to handle and soft enough for flattening and saw cutting. Rapid change in hardness at the required tempering temperatures, resulting in non-uniformity of hardness. In brief, these steels have too much hardenability and too little ductility for the application.

(b) Poor formability characteristics, making it difficult to achieve the degree of flatness desired in the product. Inherent stiffness and lack of ductility make the product unsuitable for hot or cold flattening and often leads to product breakage while attempting to flatten.

(c) High residual stresses developed during hardening leads to dimensional instability during complex machining operations, and especially if large cavities are formed to accommodate large molds.

(d) Poor surface quality as hot worked. This feature requires making product at oversize gauges to allow for proper surface cleanup in the final application.

(e) Poor weldability, making repairs difficult and unreliable.

(f) Only moderately resistant to corrosion.

(g) "Breakout" at the exit surfaces when drilled. Breakout occurs when the metal surrounding the drill exit area fractures and tears away in advance of the drill, creating a ragged hole edge.

(h) Extensive edge tearing during hot working, resulting in poor yields and also necessitates expensive edge trimming prior to hardening.

OBJECTS AND ADVANTAGES OF THE INVENTION

The material of the invention has been developed specifically for the plastics mold base industry. Every effort was made to optimize those qualities which are known to be important for both manufacturing the product and for successful operation of the equipment in which the product is used. Laboratory scale, pilot scale and full scale production melts were produced and evaluated in developing this invention. The important features of the alloy and the elements of the invention which produce these features are as follows:

(a) The chemical analysis of the invention simplified thermal processing of the cast ingot, resulting in cost and time savings. Ingots require only slow cooling after stripping, not a lengthy and costly furnace annealing treatment.

(b) The chemical analysis of the invention is designed to yield acceptable hardness for the intended application either as hot worked, as hot worked and stress relieved, as normalized or as normalized and stress relieved. No post hot working annealing cycles are required to protect the material from cracking.

(c) The inherent ductility of the invention virtually eliminates occurrences of drill breakout.

(d) The chemical analysis of the invention, specifically the low carbon level, and high chromium level and addition of copper result in improved corrosion resistance.

(e) The inherent ductility of the invention eliminates all occurrences of drill breakout.

(f) Excellent hot worked surface quality of the invention permits a reduction in over gauge allowances necessary to meet fmal product sizes. This reduces machining and grinding costs and increases overall yield from ingot to plate product.

(g) Reduced hot strength of the invention results in more effective flattening during hot working, yielding excellent as rolled flatness totally free of waviness and wrinkles. This eliminates the need for secondary cold or hot flattening operations and the improved flatness reduces the amounts of machining required to produce clean, bright metal finished surfaces.

(h) High ductility of the invention provides a material which can withstand more than twice the amount of cold deformation prior to fracture compared to current modified AISI 420 grades. High ductility also allows increased levels of Sulphur without danger of hot tearing. The increased Sulphur content produces excellent machinability.

(i) Calcium addition to the molten metal results in controlled sulfide morphology, eliminating objectionable stringer type sulfides.

(j) Thermal conductivity of the invention has been improved by reduction of chromium and addition of copper.

(k) Low carbon level and reduced hardenability result in a readily weldable material.

SUMMARY OF THE INVENTION

The invention provides an improved stainless steel for the plastic injection molding industry designed specifically to fit the application's requirements for strength, weldability, machinability, flatness, corrosion resistance, conductivity and surface quality. The invention removes the need for lengthy thermal processing during manufacture and eliminates the occurrences of failures and product losses due to low ductility and crack sensitivity of other grades commonly used for the application.

BRIEF DESCRIPTION OF THE DRAWINGS

FIG. 1 is a schematic perspective view of a rectangular plate manufactured from the present invention;

DETAILED DESCRIPTION OF THE PREFERRED EMBODIMENT

Figure 2A:
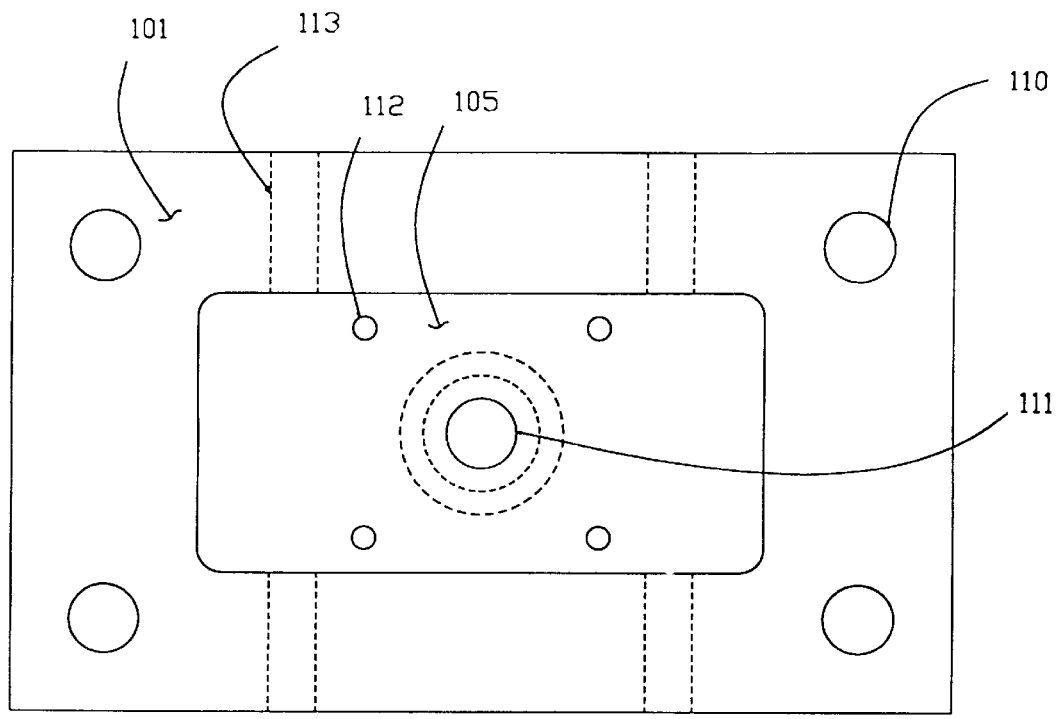
FIG. 2A is a schematic planar view of a mold base manufactured from the rectangular plate shown in FIG. 1.

The invention is a martensitic stainless steel with less than 10% ferrite phase and chemical composition as shown in Table I. The material is electric furnace melted and further processed by AOD, VOD or other suitable means for producing low carbon stainless steels. The material is calcium treated to provide optimum control over the manganese sulfide morphology. The composition range of this invention is given below in Table I.

TABLE I

Composition of Improved Steel

| Element | C | Mn | P | S | Si | Cr | Cu | Va | N |
|---|---|---|---|---|---|---|---|---|---|
| Minimum | .03 | 1.00 | .010 | .06 | .25 | 12.00 | .50 | .01 | .02 |
| Maximum | .06 | 1.60 | .030 | .30 | 1.00 | 14.00 | 1.30 | .10 | .08 |
| Typical | .04 | 1.20 | .020 | .20 | .40 | 12.50 | .80 | .04 | .05 |

The balance of the invention's composition is 80% or more Fe and those impurities and tramp elements which are inevitably included during the melting of the material. The function of each of the intentionally included elements in the analysis are as follows:

Carbon-0.06% Maximum

Carbon combines with chromium to precipitate as a carbide, depleting the effective level of chromium which negatively affects corrosion resistance. Carbon level dramatically controls hardness attainable. Maintaining the carbon level of the grade as low as possible while still achieving the designed hardness levels promotes improved corrosion resistance with addition of a minimum of chromium. Carbon content of 0.06% or less provides adequate hardenability without degrading the corrosion properties of the grade and so is thus specified.

Manganese: 1.00 to 1.60%

Manganese acts as a strengthening agent, a de-oxidizer and also, as an austenite stabilizer, prevents the formation of ferrite phase. The primary importance, however, of manganese in this grade is the formation of sulfides which prevent hot working problems, normally associated with high sulfur content without adequate manganese present in the analysis. The upper limit of 1.60% manganese is specified to control the embrittling effects of excess Manganese. The specified range of 1.00 to 1.60% manganese produces all the desired effects without any negative impact on the grade's properties.

Phosphorus: 0.010 to 0.030%

Phosphorous adds to the hardenability of steels, but is normally reduced to the lowest levels possible due to causing brittleness. For this application, the phosphorus is intentionally not reduced to extremely low levels. The range of about 0.01 to 0.03 phosphorous was specified to take advantage of phosphorus' slight contribution to corrosion resistance but more importantly for its positive affects on machinability.

Sulfur: 0.06 to 0.30%

Sulfur is the most widely used additive to steel to promote improved machinability and is specified in this steel for that reason. Sulfur at the specified level has been found to be effective in making this alloy readily machinable by all standard processes, but remains in balance with the rest of the analysis to the level that hot working properties, toughness, ductility and corrosion resistance remain acceptable.

Chromium: 12.00 to 14.00%

Chromium acts to enhance hardenability, making possible a material which will readily transform to the desired martensitic structure in heavy cross sections with air cooling. Chromium content of 12% minimum is provided to give sufficient corrosion resistance in the grade. Increasing levels of chromium promote the formation of the undesirable ferrite phase, particularly in this grade with low carbon content. The chromium is therefore controlled to the range of 12% minimum to 14% maximum.

Silicon: 0.25 to 1.00%

Silicon acts as the primary de-oxidizer in the molten metal and is therefore necessary. Increasing levels of silicon however produce ferrite. Adequate deoxidizing action occurs with silicon present in the range of 0.25% minimum to 1.00% maximum and silicon is therefore limited to this content in the alloy.

Copper: 0.50 to 1.30%

The addition of copper is a unique feature of this alloy for its intended application. At this level, copper is fully dissolved in the base metal matrix as a solid solution. The presence of copper improves the corrosion resistance and conductivity. Additionally, the copper allows the material to respond to a low temperature aging process which can be used to elevate the strength level of the material either prior to machining or after, with no apparent distortion or cracking problems. Lower levels of Copper than specified diminish the desired effect and higher levels of Copper can promote hot working problems. The range of 0.50 to 1.30 has been found to produce the planned results with no detrimental effects and so is specified as shown.

Nitrogen: 0.02 to 0.08%

Nitrogen contributes to the corrosion resistance of the material and also acts to stabilize the austenite phase, improving hardenabilty and diminishing the occurrence of a ferrite phase. Nitrogen tends to form chromium rich nitride particles during aging and tempering. These particles reduce the effectiveness of the chromium from the standpoint of corrosion resistance. Therefore, the amount of nitrogen added is kept moderate within the 0.02 to 0.08% range specified.

Vanadium: 0.01 to 0.10%

Vanadium forms a stable carbide precipitate which is very effective in controlling grain growth, necessary to produce material without grain coarsening which would promote unacceptable low ductility. Due to its tendency to increase the formation of the ferrite phase and in light of the low carbon levels in the material, vanadium level is adequate and useful at the specified range of 0.01 to 0.10%

Calcium injection in the molten metal provides shape control of the manganese sulfide inclusions in the hot worked steel. Shape control is essential to provide uniform distribution and effectiveness of these inclusions from the machinability aspect of its properties. Elongated sulfides, typical of noncalcium treated, resulfurized steels, can lead to poor surface quality in machining, drill breakout and in general poor ductility, especially in directions transverse to the primary hot working direction.

DETAILS OF MANUFACTURING

Material is produced as a low carbon stainless steel by electric furnace melting, post melt refining, deoxidation, alloy trimming, sulfur addition and calcium injection treatment. Molten metal is cast into metal ingots by bottom pouring methods. Following solidification, ingots are stripped from the molds, slow cooled and then 100% surface conditioned by grinding to prepare the metal for subsequent hot working operations.

Hot working is provided by either rolling or forging or a combination of both. In all cases, transverse hot working is utilized to minimize any directionality of mechanical properties in the material. Hot working is performed within the temperature range of 1700–2150° F. All material is flattened immediately at the conclusion of hot working while the metal is still hot. Product width to thickness ratio is controlled to assure that the producing facility has adequate power to effectively flatten the product. The invention allows free air cooling of the material after hot working without any precautions or thermal protection procedures. This practice results in time and cost savings and promotes improved flatness as the product can remain at rest on cooling beds until rigid.

Material hardness is designed to be controlled by the analysis of the melt, as opposed to reaching the desired hardness level by "tempering" back from an over hardened state as is done with traditional grades for this application. The invention provides a grade that will maintain a stable hardness profile as rolled or as normalized. The addition of a low temperature stress relieving treatment in the range of 450° F. to 650° F. acts to improve material ductility and increase dimensional stability without changing the as rolled or as normalized hardness. A hardness increase of 4 to 6 Rockwell-C can be achieved by aging the material between 700° F. and 900° F. Material can be rendered very soft, i.e., below Rockwell-C 20 hardness by over tempering in the 1200° F. to 1300° F. range if necessary to facilitate forming or flattening. Reversion to the planned hardness level is easily accomplished by normalizing the material at temperatures of 1650° F. or higher. Plates of the improved alloy may be provided with a standard heat treatment to a hardness of 32–36 HRC (BRN 301–340). Hardness above the standard range is readily obtainable with simple low temperature heat treatment. The maximum hardness attainable is about 40 HRC.

Due to the controlled hardenability, welds and weld repairs can be made on the material of this invention with no concerns of weld defects nor of deleteriously altering the properties of the base material.

Figure 2B:
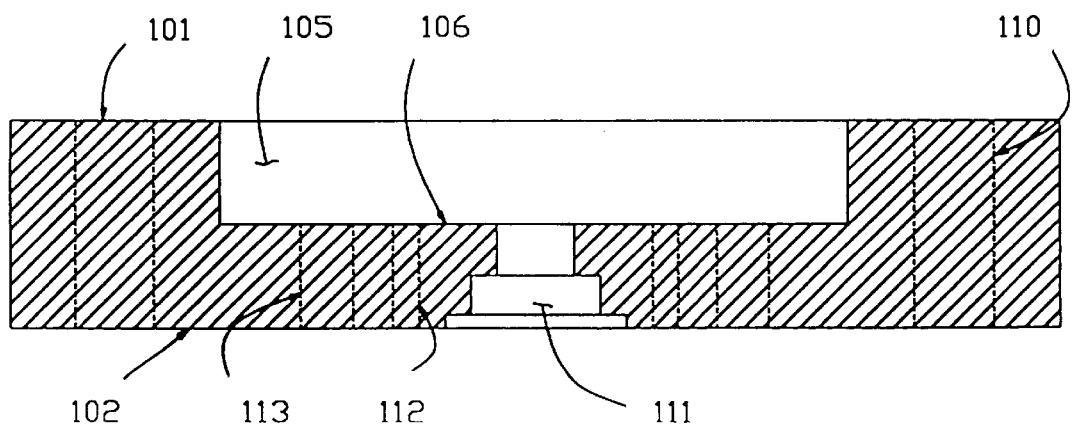
FIG. 2B is a schematic cross-sectional view of the mold base shown in FIG. 2A.

Referring to FIGS. 1–2, the invention is designed for use in manufacturing mold bases for plastic injection mold tooling. FIGS. 1 to 2B are presented to illustrate the key features of such a product.

As is illustrated in FIG. 1, the majority of the product for which the invention is designed for begins as a piece of saw cut rectangular plate 100, which is milled and/or ground to provide six smooth surfaces at specified dimensions as in the manner shown in FIG. 1. The excellent flatness of the invention as produced minimizes the amounts of material that must be removed from surfaces 101 and 102 to produce flat, parallel clean metal surfaces.

FIGS. 2A–2B show an exemplary mold base 104 manufactured from the rectangular plate 100. The mold base 104 is configured to have a rectangular cavity 105 (i.e., main pocket), typically having a flat bottom surface 106. During the manufacture and operation of the mold base 104, it is essential that surfaces 101, 102 and 106 remain parallel at all times. This is difficult when the cavity 105 is large as the removal of the material can warp the plate 100 if the material is not dimensionally stable. For example, parallel surfaces 104, 106, within about 0.005 to 0.010 inches across 24 inches is desired, and the improved alloy is believed to achieve parallel surfaces within a few thousandths of an inch across 24 inches. The invention thus provides a stable material that does not significantly distort during machining, even after heavy metal removal such as is performed when a "Main Pocket" 105 is formed.

Referring to FIGS. 2A–2B, the mold base 104 which the invention supports also requires many machined holes such as guide pin holes 110, bushing holes 111, ejector pin holes 112, cooling channels 113 and others. The invention permits rapid machining of holes with no danger of breakage around the hole exist area, due to the invention's inherent ductility and excellent quality of internal threads.

Regardless of technology, equipment and controls exercised in machining, errors inevitably occur which require repairs or replacement of machined components. The excellent weldability of the invention allows for weld repairs on the mold base 104.

HOT WORK DETAILS

The following table presents data from rolling standard 22"×56" plate ingots of "20FM" (typical of 420 stainless base "prior art") and the alloy of the present invention, approximately 16,000 lbs. each on the 140" plate mill, Lukens Steel, Coatesville, Pa. All plates were rolled to 98" wide:

|  |  | "20 FM Rolling Data | | | Inventive Alloy Rolling Data | | | |
| --- | --- | --- | --- | --- | --- | --- | --- | --- |
| Final Gauge | Plate No. | Total Passes | Average Pressure k-lbs | Average Reduction per Pass | Plate No. | Total Passes | Average Pressure k-lbs | Average Reduction per Pass |
| 1.165 | 9F0402-3 | 41 | 4604 | .522 | 9Y3274-2 | 35 | 2936 | .582 |
| 2.135 | 9F0402-5 | 41 | 4482 | .485 | 9Y3274-3 | 31 | 2819 | .641 |
| 2.625 | 9Y1183-3 | 41 | 4668 | .473 | 9Y3274-5 | 27 | 3076 | .718 |

This data indicates that as expected, the applicants new alloy requires fewer passes and lower rolling forces than 420 type materials.

Hot work conditions for 420 type stainless and the material of this invention are the same. In general, material is heated to 2150° F., held sufficiently long to "soak" through the cross section, and then rolled or forged. Rolling or forging is suspended when material temperature drops to 1700° F. The major difference is in time to heat ingots. 420 type ingots have a heating cycle of 48 hours and require charging into a relatively low temperature furnace or pit in order to avoid thermal cracking during heating and heating rates are lower for the same reason. Ingots of the improved steel material, 22"×56", were heated in 24 hours.

Plates of the improved material have shown excellent flatness as rolled and hot leveled (this hot leveling is an in-line operation at the rolling mill, done within minutes of final reduction pass on the mill). Because the improved plates can go cold with no danger of cracking, they are left to cool until rigid before lifting (prevents sagging and bending) and we are seeing flatness of better than ¼" across 12 foot spans. The improved material shows little resistance to leveling at the hot mill leveler and waves and ripples can be removed effectively. 420 type material on the other hand has higher hot strength and is very resistant to effective leveling at the hot mill, which results in most plates having some unacceptable areas of sweep, waves and/or ripples. In addition, 420 type must be picked up off the cooling tables, put into piles, covered and slow cooled to prevent cracking. This moving while hot and the irregular support offered by the random stacking has always lead to bending of plates, which then must later be flattened. Annealing is also done in irregular piles which tends to yield sagging ends when piles are not built with longest plate on the bottom, next longest second, etc. The secondary flattening, done by roller leveling up to 2⅝" gauge and gag press above 2⅝", is not very effective as it can only be done with the plates warm (300–400° F.) and plates often either spring back to an out-of-flat condition during subsequent heat treating or even break catastrophically during the flattening operations.

Thermal conductivity of the alloy is adequate for its intended applications and is comparable to 420 type stainless materials.

Corrosion has been evaluated first by placing polished samples of 420 type material and the Applicants' improved material near the seashore and visually evaluating after several weeks exposure. The improved material of this invention showed little, if any, effect of the exposure, while the 420 type developed rusting. The second evaluation was to machine full-size mold plates from both types of material and allow them to sit outdoors (mold system storage without rusting is a benefit to users) unprotected. Plates made of the improved material of this invention have been exposed over six months now and show no rusting, while the 420 material has become generally rusty and corroded. Again, these are qualitative rather than quantitative, but in the mold business, sophisticated testing is not performed or required, as molds are typically exposed to cooling water or the weather and humidity, and seldom exposed to any serious chemical systems, such as chlorides.

Exemplary mechanical and physical properties are given below:

| Typical Mechanical Properties - Improved Alloy vs. 420 Type Material | | | | |
|---|---|---|---|---|
| Grade | UTS - ksi | .2% YS - ksi | % EL in 2" | % RA |
| 420 Type SS | 155.0 | 132.0 | 10.0 | 20.0 |
| Applicants' Improved Alloy | 155.0 | 127.0 | 12–14 | about 35.0 |

PHYSICAL DATA

Prehardened to 321 HB. Data at room and elevated temperatures.

| Temperature | 68° F. (20° C.) | 390° F. (200° C.) |
|---|---|---|
| Density, kg/m³ | 7,800 | 7,750 |
| lbs/in³ | .282 | .280 |
| Modules of elasticity | | |
| N/mm² | 20,000 | 19,000 |
| psi | 29.0 × 10⁶ | 27.6 × 10⁶ |
| Coefficient of thermal expansion | | |
| per ° F. from 68° F. | — | 6.1 × 10⁶ |
| per ° C. from 20° C. | — | 11.0 × 10⁶ |

Actual machining trials have shown that the improved material of this invention machines easily (with equal or less horsepower) than 420 types at the same hardness levels, and yet gives better surface finishes, excellent quality of drilled and tapped hole threads and not a single incidence of material breakout (fracture) at the exit side of a plate when drilling large diameter holes at high rates of speed. Breakout is common in all 420 types and was one of the key reasons for developing this improved material. The behavior of this improved material is a direct result of higher sulfur (for improved chip breakage) yet with better material ductility.

Better weldability of the improved material of this invention vs. a 420 type stainless is a given. Enough history exists to show that a steel with 0.04% C and 13.0% Cr will be vastly superior to a 0.32% C and 16.0% Cr steel. The extreme hardenability of the latter leads to cracking and high hardness (55 Rockwell-C in the heat affected zone vs. 35 Rockwell-C in the original base material), while the improved material is designed to produce its usable hardness of 34–36 Rockwell-C even as normalized, and therefore the heat affected zone does not overharden. A slight hardness increase is experienced in the improved material due to the aging effect, but this is typically a 2–4 Rockwell-C increase and is accompanied by increased ductility which yields excellent welds with no cracking. The hardness is believed uniform and consistent in all directions.

The improved alloy may be easily welded with no preheat or post heat treatment. The heat affected zone does not exhibit extremely high hardness as with the prior art 420F and other high carbon metals. Further, the improved alloy has significantly reduced the risk of cracking during and after welding, to an almost negligible level. Moreover, photomicrographs reveal a uniform hardness throughout the weld, heat affected zone and base metal. The above advantages assume the welding electrodes are of the same alloy as the improved material of this invention.

The resulting alloy of this invention has increased toughness and uniformity which reduces the risk of breakage caused by machining pressures and stresses. The material also reduces the risk of plate cracking during the entire life of the mold. Charpy V-notch (CVN) impact tests at room temperature of the improved material have an average CVN of about 16, compared to a CVN of 8 for 420F steel. A 12% elongation in 2" is significantly more than the 9% comparable elongation for 420F steel. Similarly, a 32% RA for the improved alloy is a considerable improvement over the 20% RA for the 420F alloy. Typical impact properties of the improved alloy are given below.

IMPACT STRENGTH
Longitudinal Charpy V-notch

Tests from a 3" (76 mm) rolled plate at 321 HB

| Testing temperature | 68° F. (20° C.) | 390° F. (200° C.) |
|---|---|---|
| Ft-lbs | 16 | 26 |
| Joules | 22 | 36 |

The increased hot ductility of this alloy promotes smoother "as rolled" plate surfaces that are free of tears and cracks, thus reducing the possibility of cracks remaining after machining. The improved surfaces mean less stock removal to produce finished sizes, resulting in less machining and lower material costs.

the foregoing fully reveals the gist of the present invention so that others can, by applying current knowledge, readily adapt it for various uses without omitting features that, from the stand point of prior art, fairly constitutes essential characteristics of the generic or specific aspects of this invention, and, therefore, such adaptations should and are intended to be comprehended within the meaning ad range of equivalence of the following claims.

What is claimed is:

1. A process of manufacturing a mold base for plastic injection molds, said process comprising the steps of:

heat treating a steel alloy comprising about 1.0%–1.6% by weight Mn, about 0.01%–0.03% by weight P, about 0.25%–1.0% by weight Si, about 0.5%–1.3% by weight Cu, about 0.01%–0.1% by weight V, about 0.02%–0.08% by weight N, about 0.03%–0.06% by weight C, about 12.0%–14.0% by weight Cr, about 0.06%–0.3% by weight S and the balance being Fe with residual impurities, at a temperature not lower than 2150° F.;

hot working said steel alloy within the temperature range of about 1700–2150° F.;

cooling said steel alloy by free air cooling to room temperature; and forming a mold base from said alloy for use in plastic injection molding.

2. The process of claim 1, wherein said step of hot working said steel alloy comprises the steps of rolling or forging said steel alloy.

3. The process of claim 2, further comprising hot leveling said steel alloy after finalizing said rolling or forging.

4. The process of claim 1, further comprising the step of a stress relieving treatment performed in a temperature range of 450–650° F.

5. The process of claim 1, further comprising the step of aging said steel alloy at a temperature range of 700–900° F. to raise the HRC-hardness value of said alloy by 4 to 6 hardness units.

* * * * *